July 20, 1943.
P. SPENCE
2,324,736
HOT WATER SYSTEM
Filed June 28, 1940
2 Sheets-Sheet 2
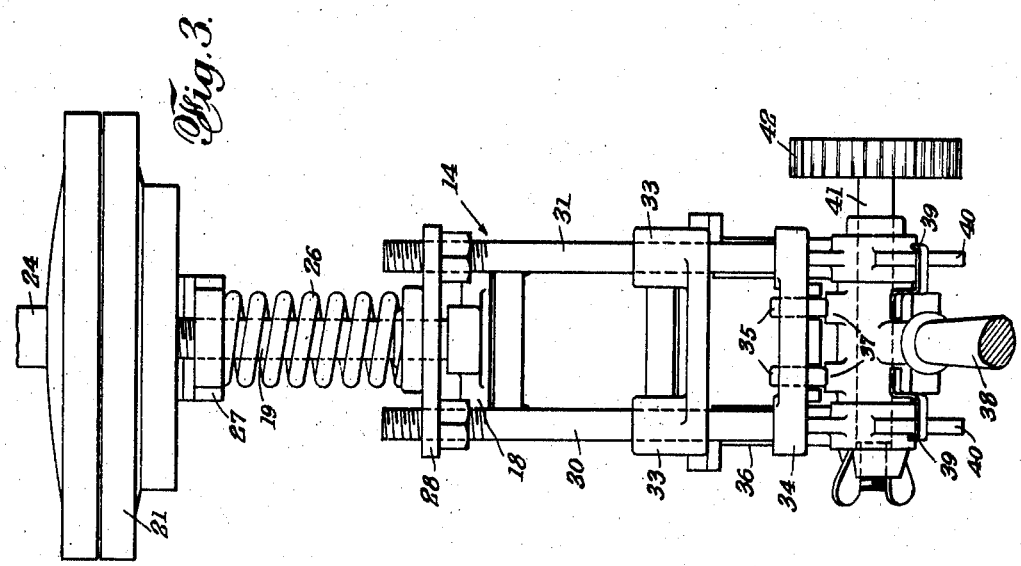
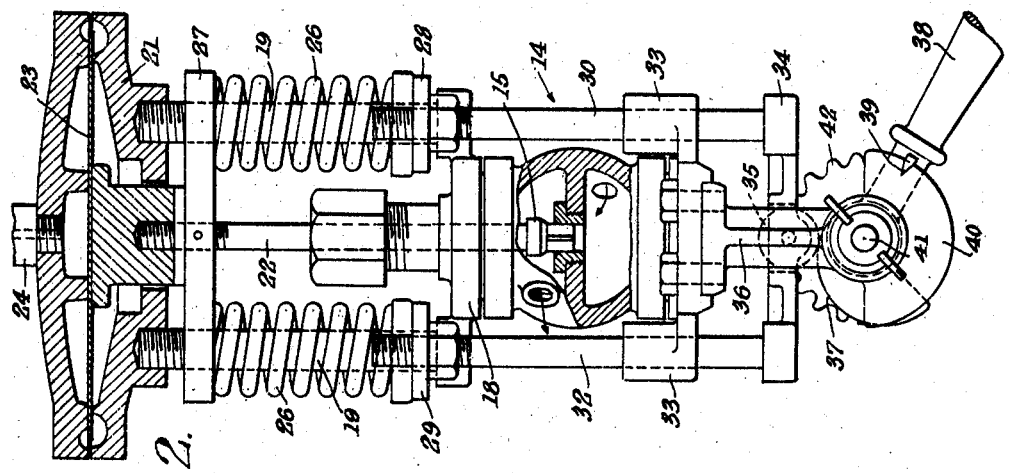
INVENTOR
PAULSEN SPENCE
BY
Mathus Behat
ATTORNEYS Patented July 20, 1943

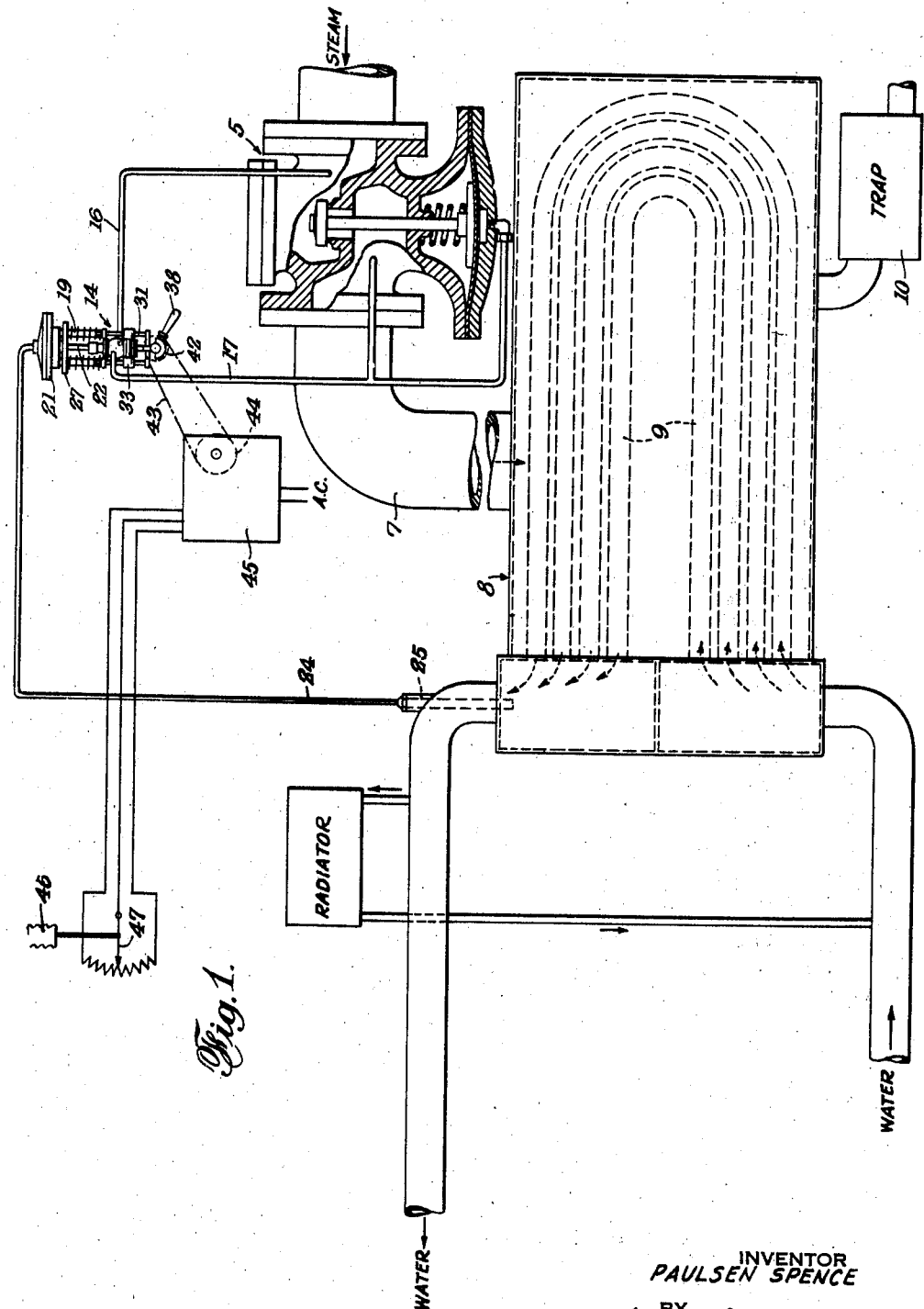

2,324,736

UNITED STATES PATENT OFFICE 2,324,736

HOT-WATER SYSTEM

Paulsen Spence, East Orange, N. J., assignor to Spence Engineering Company, Inc., Walden, N. Y., a corporation of New York Application June 28, 1940, Serial No. 342,877

3 Claims. (Cl. 236—9)

My invention relates to a hot water heating system and this application is a continuation in part of my application, Serial No. 47,778, filed November 1, 1935.

It is an object of the invention to provide an improved control means for a heating system, particularly a water heating system.

It is a further object to provide a heating system, particularly for hot water, in which the heat input is controlled in accordance with the desired temperature of the water, together with means for varying the control of the heat input in accordance with another control condition.

Another object is to provide improved valve means, particularly in connection with manual or automatic adjustment of the valve loading means.

Other objects and various features of novelty and improvement will be hereinafter pointed out or will become apparent to those skilled in the art.

In the drawings which show, for illustrative purposes only, a preferred form of the invention—

Fig. 1 is a more or less diagrammatic or schematic view of a hot water heating system embodying features of the invention;

Fig. 2 is a vertical, partly sectional view of a valve, illustrating features of the invention;

Fig. 3 is a view in elevation of the valve shown in Fig. 2 but viewed at right angles thereto.

As specifically illustrated, my invention is embodied in a system having means to regulate the temperature of the water in a hot water system. The water in the hot water heating system may be heated in a heater by means of steam or other heating fluid introduced into the heater; for example, the regulating valve 5 may control the steam passing through the pipe 7 to the heater 8 which, in the form shown, is an indirect heater embodying coils or other water heating devices 9. The condensate from the heater 8 may pass out, as usual, through a trap 10. The valve 5 is preferably of the general type disclosed in my Patent No. 1,995,949, granted March 26, 1935. The valve 5 is preferably controlled by means of a pilot valve 14. The pilot valve 14 may include a valve member 15 controlling the supply of steam entering through pipe 16 from the high pressure side of the valve 5 and emerging through pipe 17 by which it is conducted to the diaphragm chamber of the main valve 5 for actuating the latter as set forth in said patent.

The body of the pilot valve 14 has a bonnet 18, which carries standards 19—19 and a pilot-valve-diaphragm chamber 21 is secured to and carried by the upper ends of the standards 19—19. The valve stem 22 extends through the valve bonnet and its upper end is connected to or cooperable with the diaphragm 23. A pipe 24 leads into the diaphragm chamber 21 above the diaphragm 23. The pipe 24 at its opposite end carries means such as a thermostat 25, which may be a gas or liquid carrying bulb so positioned as to be affected by the temperature of the heated water as shown in Fig. 1. Thus, when the temperature of the water in the heater is raised, the thermostatic pressure acting through the pipe 24 will expand the diaphragm 23 downwardly to urge the valve 15 in a closing direction. The valve 15 is urged in the opposite or opening direction by loading means preferably in the form of spring means, which may include a pair of spaced apart coil springs 26—26.

The springs 26—26 may be centered on the standards 19—19 and at the upper ends may engage a bridging member 27 connected to or cooperating with the valve stem 22, as will be clear. The lower ends of the springs 26—26 are supported on movable abutment means and such means may include bridging members 28—29. The bridging member 28 is adjustably carried by guiding means such as guide rods 30—31, and the bridging member 29 may be carried by guides such as 32. The guides 30, 31, 32 are guided with relation to the valve body as by means of guide bosses 33 on the valve body or bottom closure thereof. The lower ends of the guide rods are connected to and carried by a bottom platform or bridging member 34; and, by adjusting the platform 34 either up or down, the stress on the springs 26—26 may be varied.

The actuation of the platform 34 may be by manual or automatic means, or both. In the form illustrated, the platform 34 carries a pair of cam followers or rolls 35 and a bracket 36 carried by the valve body or a part of the lower bonnet carries pivotally mounted cams 37—37. A handle 38 may be carried by the cam assembly so that the latter may be rotated for raising and lowering the abutment system for the springs so that the spring stress may be varied. If desired, the handle may carry a pointer 39 which passes along a dial scale 40 which may have designations thereon to indicate the stress of the springs or other designations; for example, to indicate the temperature of the water.

A shaft 41 which carries the cam assembly may also carry means such as a sprocket 42 which may be actuated by a chain 43 trained over a sprocket 44 on a reversing type of electric motor 45. Thus, when the electric motor is rotated in one direction, the sprockets and chain will cause the cams to raise the spring abutment system; and, when the motor is rotated in the opposite direction, the spring abutment system will be lowered and the spring stress thus lessened. The motor 45, which may be a "Modutrol" motor, as manufactured by the Minneapolis-Honeywell Regulating Company, is preferably controlled by or in accordance with any desired control condition; for example, the motor may be controlled in accordance with the temperature of a room to be heated or in accordance with the outside temperature, or, in fact, in accordance with any desired control condition whether that be temperatrue or otherwise. In the form shown, a bellows type thermostat 46 actuates a potentiometer blade 47 for varying the resistance in the lines of the three wire system controlling the reversible motor 45. It will be seen that when the thermostat 46 expands so as to swing the potentiometer blade 47 in a counterclockwise direction, the motor 45 will be operated in one direction so as to decrease the stress on the spring and, contrariwise, when the potentiometer blade 47 is moved in the opposite direction, the motor 45 will be rotated so as to increase the spring stress. When the control condition as exemplified by the thermostat 46 remains constant, operation of the main valve will be controlled in accordance with the temperature of the water in the heater 8. However, when the control condition changes so as to actuate the thermostat 46, the valve 5 will be controlled in its operation jointly by the temperature of the water in the heater and the thermostat 46. The initial setting of the pilot valve by means of the cam and follower assembly may be readily made by disconnecting the chain 43 from the sprocket 42; and, when the desired initial setting has been made, the chain may be reconnected to put operation of the entire system once more under the control of the thermostat 25 and other means such as the thermostat 46.

A modification consists in employing a diaphragm combination as in the pilot valve 14 but omitting the valve structure and function. The stem 22 may form a part of or actuate switching mechanism to close contacts for operating a reversible electric motor in either direction to directly actuate a balanced steam valve instead of the motor operated valve 5. Thus, when the loading of the diaphragm, as 23, is increased, the reversible motor will be operated to open the balanced valve and admit more steam; and, when the steam pressure builds up on the diaphragm 23, its valve stem will be moved to break the motor contact to stop the motor and the balanced valve. When the loading is decreased, the opposite action occurs and the outlet steam pressure will be lowered.

While the invention has been described in considerable detail and preferred forms set forth, it is to be understood that various changes and modifications may be made within the scope of the invention as defined in the appended claims.

I claim:

1. In a hot water system, a hot water heater, means for supplying steam thereto, a main valve for controlling the supply of steam to said water heater, a pilot valve for controlling the actuation of said main valve, loading means for said pilot valve to actuate the same in one direction, thermostatic means subject to the temperature of water in said water heater for actuating said pilot valve in the opposite direction, and means including a second thermostatic means subject to the hot water demand for varying the loading on said pilot valve.

2. In a system of the character indicated, means for controlling the supply of a heating medium to said system to vary the temperature of a part of said system, said means including valve means, loading means for a part of said valve means to actuate the same in one direction, thermostatic means subject to the temperature of the aforesaid part of said system for actuating said part of said valve means in the opposite direction, and means including a second thermostatic means subject to the temperature varying demand for varying the loading on said part of said valve means.

3. In a system of the character indicated, means for controlling the supply of a heating medium to said system to vary the temperature of a part of said system, said means including a main valve and a pilot valve for controlling the actuation of said main valve, loading means for said pilot valve to actuate the same in one direction, thermostatic means subject to the tempertaure of the aforesaid part of said system for actuating said pilot valve in the opposite direction, and means including a second thermostatic means subject to the temperature varying demand for varying the loading on said pilot valve.

PAULSEN SPENCE.